(12) United States Patent
Fuhlbrigge et al.

(10) Patent No.: US 9,008,841 B2
(45) Date of Patent: Apr. 14, 2015

(54) ROBOTIC PICKING OF PARTS FROM A PARTS HOLDING BIN

(75) Inventors: Thomas A. Fuhlbrigge, Ellington, CT (US); Carlos Martinez, New Britain, CT (US); Gregory F. Rossano, Enfield, CT (US); Steven W. West, Howell, MI (US)

(73) Assignee: ABB Research Ltd., Zurich (CH)

( * ) Notice: Subject to any disclaimer, the term of this patent is extended or adjusted under 35 U.S.C. 154(b) by 151 days.

(21) Appl. No.: 13/392,299

(22) PCT Filed: Aug. 26, 2010

(86) PCT No.: PCT/US2010/046819
§ 371 (c)(1),
(2), (4) Date: Mar. 14, 2012

(87) PCT Pub. No.: WO2011/031523
PCT Pub. Date: Mar. 17, 2011

(65) Prior Publication Data
US 2012/0165986 A1 Jun. 28, 2012

Related U.S. Application Data

(60) Provisional application No. 61/237,420, filed on Aug. 27, 2009.

(51) Int. Cl.
*B25J 9/00* (2006.01)
*B25J 9/16* (2006.01)

(52) U.S. Cl.
CPC .............. *B25J 9/1697* (2013.01); *B25J 9/1687* (2013.01); *G05B 2219/40035* (2013.01); *G05B 2219/40053* (2013.01); *G05B 2219/40537* (2013.01); *G05B 2219/40583* (2013.01)

(58) Field of Classification Search
CPC ...... B25J 9/1697; B25J 9/1612; B25J 9/1687; B25J 9/1694; B25J 9/1602; B25J 15/0004; G05B 19/4183; G05B 2219/39001; G05B 2219/39011; G05B 2219/36412; G05B 2219/39466; G05B 2219/39108; G05B 2219/39508
USPC ............ 700/219, 253, 258, 259, 262; 901/30, 901/31, 46, 47, 50
See application file for complete search history.

(56) References Cited

U.S. PATENT DOCUMENTS

| 4,830,565 A | 5/1989 | Bucher et al. |
| 4,835,730 A | 5/1989 | Shimano et al. |

(Continued)

FOREIGN PATENT DOCUMENTS

| DE | 10319253 A1 | 12/2004 |
| DE | 102008052436 A1 | 4/2010 |

(Continued)

OTHER PUBLICATIONS

"Fuzzy Network for Dual-Gripper-Picker Library Control" IBM Technical Disclosure Bulletin, IBM Corp. New York, US, vol. 37 No. 10, Oct. 1, 1994, pp. 417-420, XP000475722 ISSN: 0018-8689.

(Continued)

*Primary Examiner* — Jason Holloway
(74) *Attorney, Agent, or Firm* — Michael M. Rickin (57) ABSTRACT

A robot system (10) for picking parts (41) from a bin (40) uses the image from one or more cameras (38) to determine if the robot gripper (24) has picked one part or more than one part and uses one or more images from one or more cameras (38) to determine the position/orientation of a picked part. If the robot (12) has picked more than one part from the bin (40) then attempt is made to return the excess picked parts to the bin (40). The position/orientation of a picked part that does not meet a predetermined criteria is changed.

11 Claims, 6 Drawing Sheets

(56) References Cited

U.S. PATENT DOCUMENTS

| | | | |
|---|---|---|---|
| 4,906,907 A | 3/1990 | Tsuchihashi et al. | |
| 4,985,846 A * | 1/1991 | Fallon | 382/153 |
| 5,446,835 A | 8/1995 | Iida et al. | |
| 5,601,229 A | 2/1997 | Nakazato et al. | |
| 5,622,470 A | 4/1997 | Schaefer et al. | |
| 5,687,901 A | 11/1997 | Hoshiba et al. | |
| 5,867,260 A * | 2/1999 | Sakai | 356/237.3 |
| 6,212,443 B1 | 4/2001 | Nagata et al. | |
| 6,328,523 B1 | 12/2001 | Watanabe et al. | |
| 6,721,444 B1 | 4/2004 | Gu et al. | |
| 7,313,464 B1 | 12/2007 | Perreault et al. | |
| 7,792,609 B2 | 9/2010 | Strasser et al. | |
| 2002/0147527 A1 | 10/2002 | McCall et al. | |
| 2004/0265110 A1 | 12/2004 | Schnoor et al. | |
| 2006/0057239 A1 | 3/2006 | Hariki et al. | |
| 2006/0149421 A1 | 7/2006 | Akiyama et al. | |
| 2006/0184272 A1 | 8/2006 | Okazaki et al. | |
| 2007/0177790 A1 * | 8/2007 | Ban et al. | 382/153 |
| 2008/0082213 A1 * | 4/2008 | Ban et al. | 700/260 |
| 2008/0133058 A1 | 6/2008 | Ohno | |
| 2011/0223000 A1 * | 9/2011 | Martinez et al. | 414/730 |
| 2011/0223001 A1 * | 9/2011 | Martinez et al. | 414/730 |
| 2011/0288683 A1 * | 11/2011 | Kondo et al. | 700/260 |

FOREIGN PATENT DOCUMENTS

| | | |
|---|---|---|
| EP | 0951968 A2 | 10/1999 |
| EP | 1043642 A2 | 10/2000 |
| EP | 1862270 A2 | 12/2007 |
| WO | 2011031523 A3 | 3/2011 |

OTHER PUBLICATIONS

Albert-Jan Baerveldt—"Contribution to the Bin-Picking Problem; Robot Using Multiple Sensors" Dissertation No. 10348 submitted to the Swiss Federal Institute of Technology, (on line) 1993, XP002533922 Zurich.

Ghita O et al: "A bin picking system based on depth from defocus" Machine Vision and Applications Springer-Verlag Germany (Online) vol. 13, No. 4 2002, pp. 234-244, XP002533923 ISSN:0932-8092.

* cited by examiner

ROBOTIC PICKING OF PARTS FROM A PARTS HOLDING BIN

FIELD OF THE INVENTION

The field is the use of a robot to pick parts from a bin that holds the parts to be picked by the robot.

DESCRIPTION OF THE PRIOR ART

Existing systems have used various contact or other non-vision sensing means such as force or proximity sensors to detect if one or more parts have been successfully picked from a bin that is holding the parts to be picked by the robot. These techniques can detect if only a single part has been picked by the robot from the bin, but cannot determine the orientation of the picked part or the nature of the interlocking if multiple entangled parts have been picked.

The term "bin" as used herein means, without limitation, any container, carton, box, tray or other structure that can receive and hold the parts to be picked by the robot.

SUMMARY OF THE INVENTION

A robotic system for picking parts from a bin has a robot having a gripper for picking one of the parts from the bin when the robot is so commanded. The system also has one or more cameras mounted to provide one or more images that show how many of the parts in the bin are held by the gripper after the robot is commanded to pick one of the parts from the bin and the gripper is retracted from the bin. The system further has a computing device programmed to use the one or more images to, when the one or more images shows that the retracted gripper is holding only one of the parts, determine if the position and/or orientation of the only one held part meets a predetermined criteria for the position and/or orientation of the only one held part. The computing device is further programmed to, after it is determined that the only one part held by the retracted gripper does not meet the predetermined criteria for the position and/or orientation of the only one part held by the retracted gripper, command the robot to move the retracted gripper holding the only one part to return the picked only one part held by the gripper to the bin.

A robotic system for picking parts from a bin has a robot having a gripper for picking one of the parts from the bin when the robot is so commanded. The system also has one or more cameras mounted to provide one or more images that show how many of the parts in the bin are held by the gripper after the robot is commanded to pick a part from the bin and the gripper is retracted from the bin, The system further has a computing device programmed to use the one or more images, after the one or more images shows that the retracted gripper is holding only one of the parts, to determine if the position and/or orientation of the only one part held by the retracted gripper meets a predetermined criteria for the position and/or orientation of the only one part held by the retracted gripper; and the computing device is further programmed to, after it is determined that the only one part held by the retracted gripper does not meet the predetermined criteria for the position and/or orientation of the only one part held by the retracted gripper, command the robot either by itself or together with the gripper or only the gripper to adjust the position and/or orientation of the only one part held by the retracted gripper to be within the predetermined criteria.

DETAILED DESCRIPTION

Figure 1:
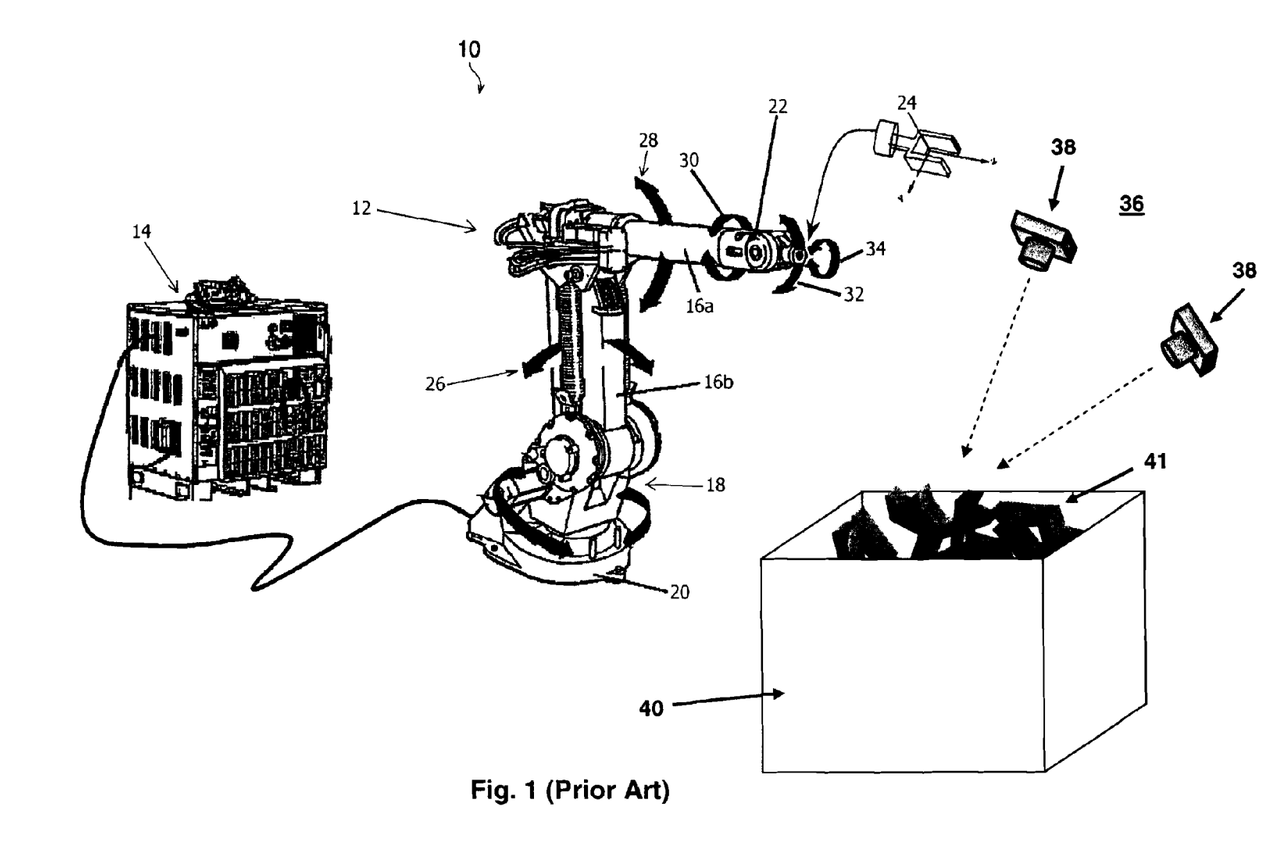
FIG. 1 shows a prior art vision system for a robot to pick parts from a bin.

Referring now to FIG. 1 there is shown one example of a prior art six-axis industrial robot manipulator system 10 that can be used for picking parts 41 from a bin 40.

Robot systems such as system 10 typically include a manipulator assembly 12 and a computer-based controller 14. The robot manipulator assembly 12 includes an upper arm 16a and lower arm 16b. The manipulator assembly 12 has one end mounted through a first joint 18 to a base 20, and a wrist 22 on the opposite end. A grasping mechanism 24, also known as a gripper, is mounted to wrist 22 and is configured to receive a part. The grasping mechanism 24 and other devices such as a work-piece that are mounted to the robot wrist 22, are together known generally as an end-effector.

FIG. 1 also shows a vision system 36 having two cameras 38 not mounted on the robot and a bin 40 filled with parts 41 to be picked by robot 12 using grasping mechanism 24, also known as an end of arm tool. As is well known, vision system 36 also has a computing device which is not shown in FIG. 1.

The vision system 36 is used to determine the part location and orientation in the bin 40. The images from cameras 38 have not been previously used for post pick analysis such as determining if the robot has picked more than one part 41 from the bin 40 or the orientation of the picked part 41. The vision system 36 shown in FIG. 1 is by way of example and not of limitation. That system could have more or less cameras, use laser lighting, have the cameras mounted on the robot 12 etc.

Many types of errors can occur when using an industrial robot 12 and machine vision system 36 to automate bin picking. Because parts 41 are randomly distributed in a bin 40, parts could become interlocked with each other, entangled, and/or obstructed. When such interlocked, entangled and/or obstructed parts 41 are removed from the bin 40, several errors can occur. For example, a part 41 could be completely pulled out of the grasping mechanism (gripper) 24 during the extraction. Even if a part 41 is not pulled out of the gripper 24, its position and/or orientation could shift while it remains in the gripper 24. Such a shift can cause collision issues and other problems when the picked part is presented for the next robotic procedure, such as an incorrect placement of the gripped part 41 on a conveyer.

Another error that can be caused by interlocking and entangled parts 41 is the accidental picking of extra parts 41. This error can also cause problems for the next procedure that uses the picked part 41, because two or more parts 41 would be delivered to the station that handles the picked part. For example, if the next procedure is for the robot that has picked the part to place a single picked part 41 on a conveyer, the accidental placement of additional parts 41 on the conveyer would likely cause a jam to occur. The additional parts 41 can also be a safety concern since the robot's quick motions could cause a partially entangled part 41 to loosen and fly in a random direction in the robot cell, causing damage and possible human injury.

The system in previously described FIG. 1 and the systems in FIGS. 2, 3 and 4, which are described below, each have one or more cameras 38 that are either mounted on the robot 12 and/or in other locations in the work cell to view what is being held by the gripper 24. The images from the cameras 38 can be used to detect picking errors and the orientation of the picked part. Each robot or cell mounted camera 38 can be used either for only obtaining images for selecting parts to pick, or only for obtaining images for pick error and orientation analysis, or for obtaining images for both of these tasks.

Figure 2:
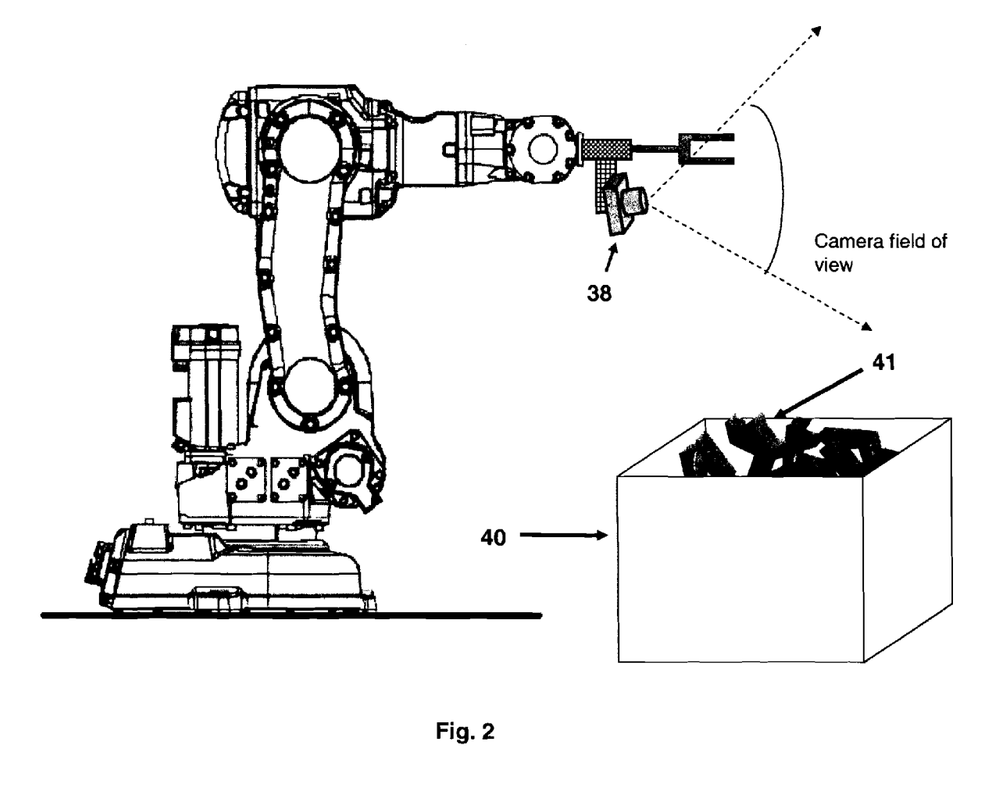
FIGS. 2, 3 and 4 show embodiments for the present vision system for a robot to pick parts from a bin.
Figure 3:
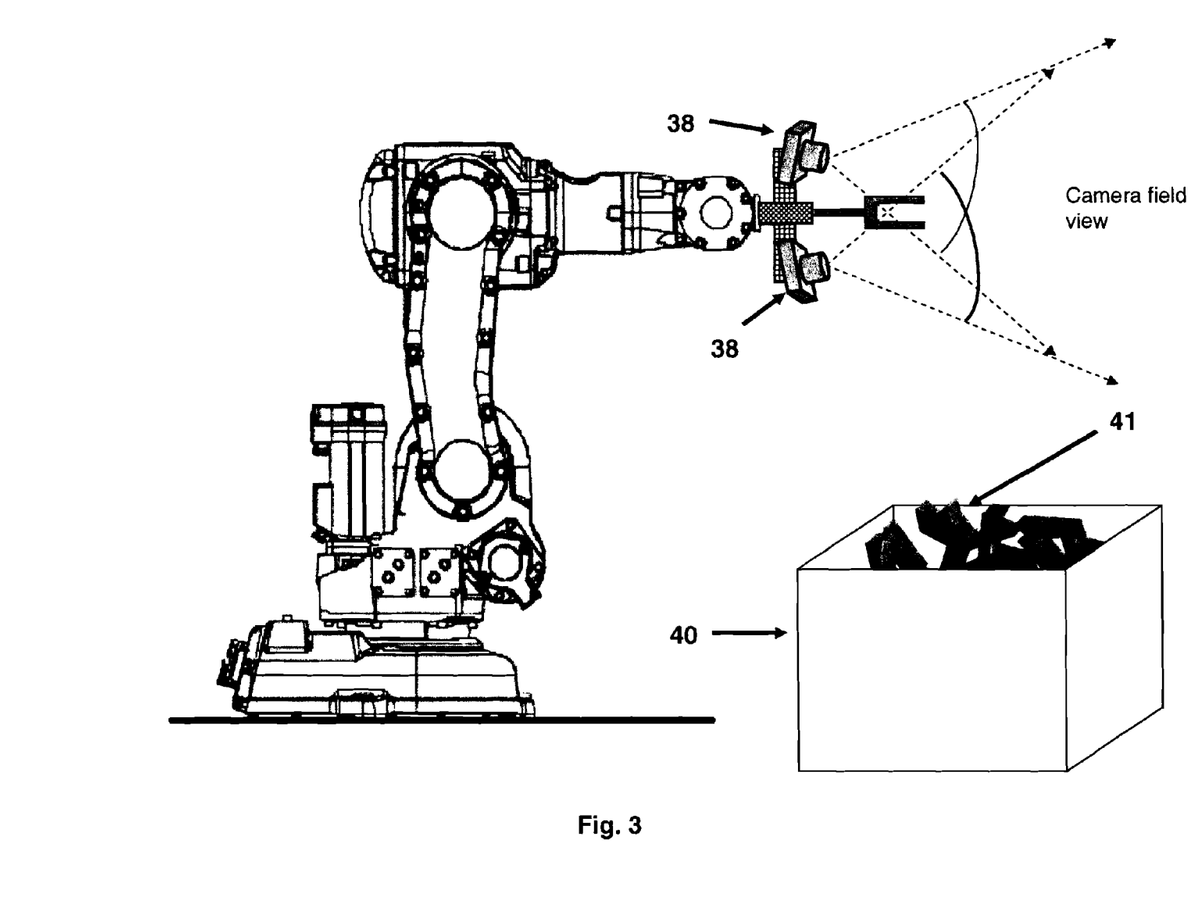
Figure 4:
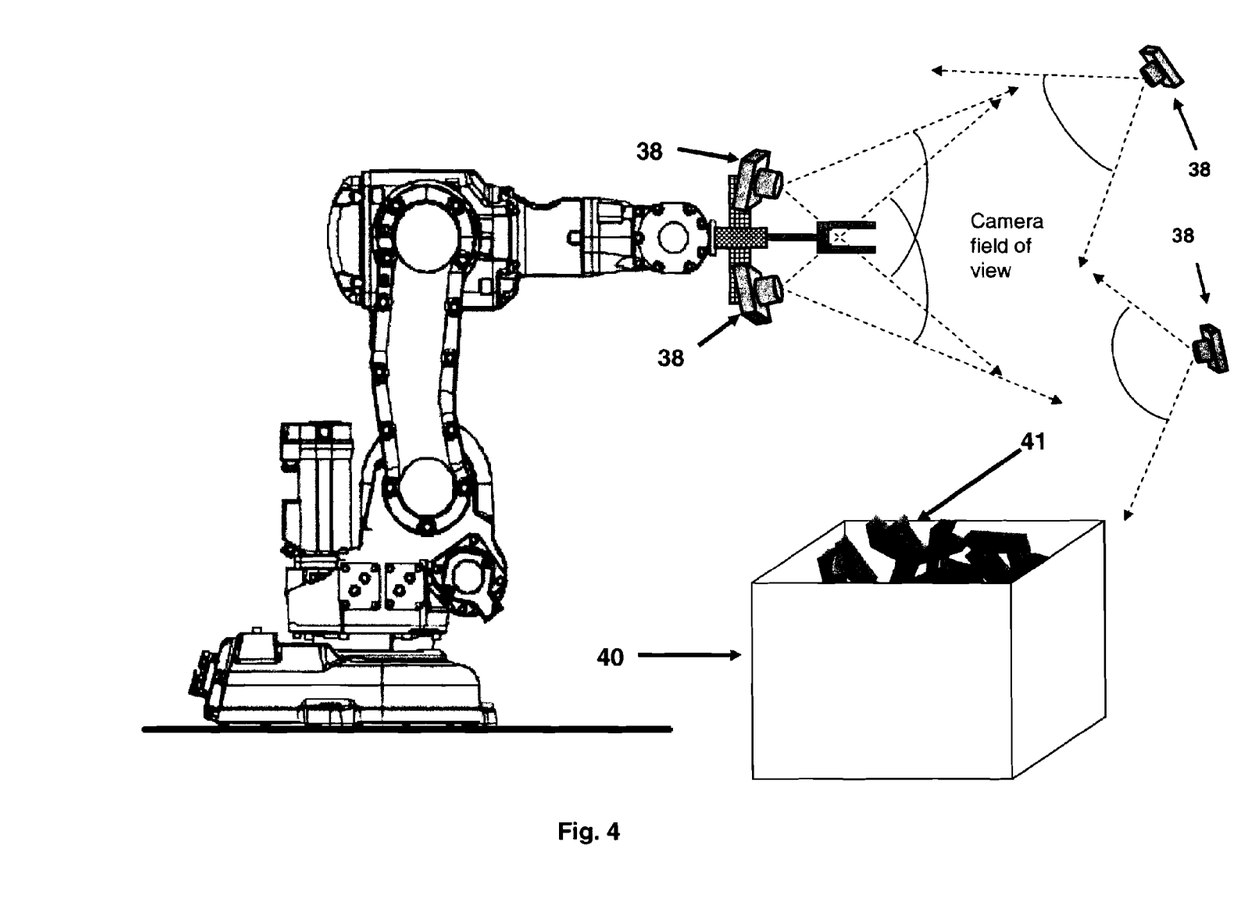

The systems in FIGS. 2, 3 and 4 each show the robot 12, cameras 38, gripper 24, and a bin 40 having parts 41 therein to be picked by robot 12.

FIG. 2 shows one camera 38 mounted on the robot 12 adjacent to and below the horizontal axis of the gripper 24. FIG. 3 shows two cameras 38 mounted on robot 12 on either side of the horizontal axis of gripper 24. FIG. 4 shows two cameras 38 mounted on robot 12 on either side of the horizontal axis of gripper 24 and two cameras 38 not mounted on robot 12. The camera(s) 38 shown in FIGS. 2 and 3 may or may not be the same camera(s) 38 used to detect the location of parts 41 in the bin 40.

In the systems shown in FIGS. 1-4, the software associated with the vision system uses the images from one or more of the cameras 38 to detect the presence and/or position/orientation of the part 41 in the gripper 24 after the robot 12 has picked a part 41 from bin 40. This software could be part of the same software that detects the locations of the parts 41 in the bin 40, or completely separate from that software. This software may be in controller 14 which is a computing device or in a separate computing device such as a PC or in the camera(s) 38 if the camera(s) are smart cameras, that is, have a built in computing device.

If a part 41 is not visibly in the gripper 24 after the extraction motion is complete, then another pick 41 would be attempted. This check that the picked part 41 is visibly in the gripper 24 can be done immediately after the extraction of the part 41 from bin 40 should have been completed, and repeated just before the part 41 is used for the next operation (such as placement on a conveyor). The performing of this check for a second time is to ensure that a loosely grasped part 41 was not accidentally dropped during the robot motions between the extraction of the part 41 from bin 40 and the start of the next operation.

The same vision software components used to locate parts 41 in the bin 40 or additional vision software components can also use the images from the cameras 38 to detect the presence of additional parts 41 attached to the gripper 24 and/or a part 41 that was intentionally picked by robot 12 from bin 40. If the robot 12 has picked additional parts 41 from bin 40, then the grasped parts 41 are moved over the bin 40 and then rotated or shaken over the bin 40 to thereby return the extra picked parts 41 to the bin 40. After this operation, the additional vision software components need to recheck how many parts 41 are in the gripper 24, and, if necessary, repeat either the pick procedure or the procedure to return the extra picked parts 41 to the bin 40. This rechecking of how many parts 41 are in gripper 24 is stopped if a predetermined drop attempt limit has been reached. This determination prevents the robot 12 from continuously repeating the foregoing operation. The predetermined drop attempt limit could, for example, be based either on the expiration of a predetermined period of time after the parts 41 were initially picked from bin or reaching a predetermined number of attempts to return the excess picked parts 41 to the bin 40.

Figure 5:
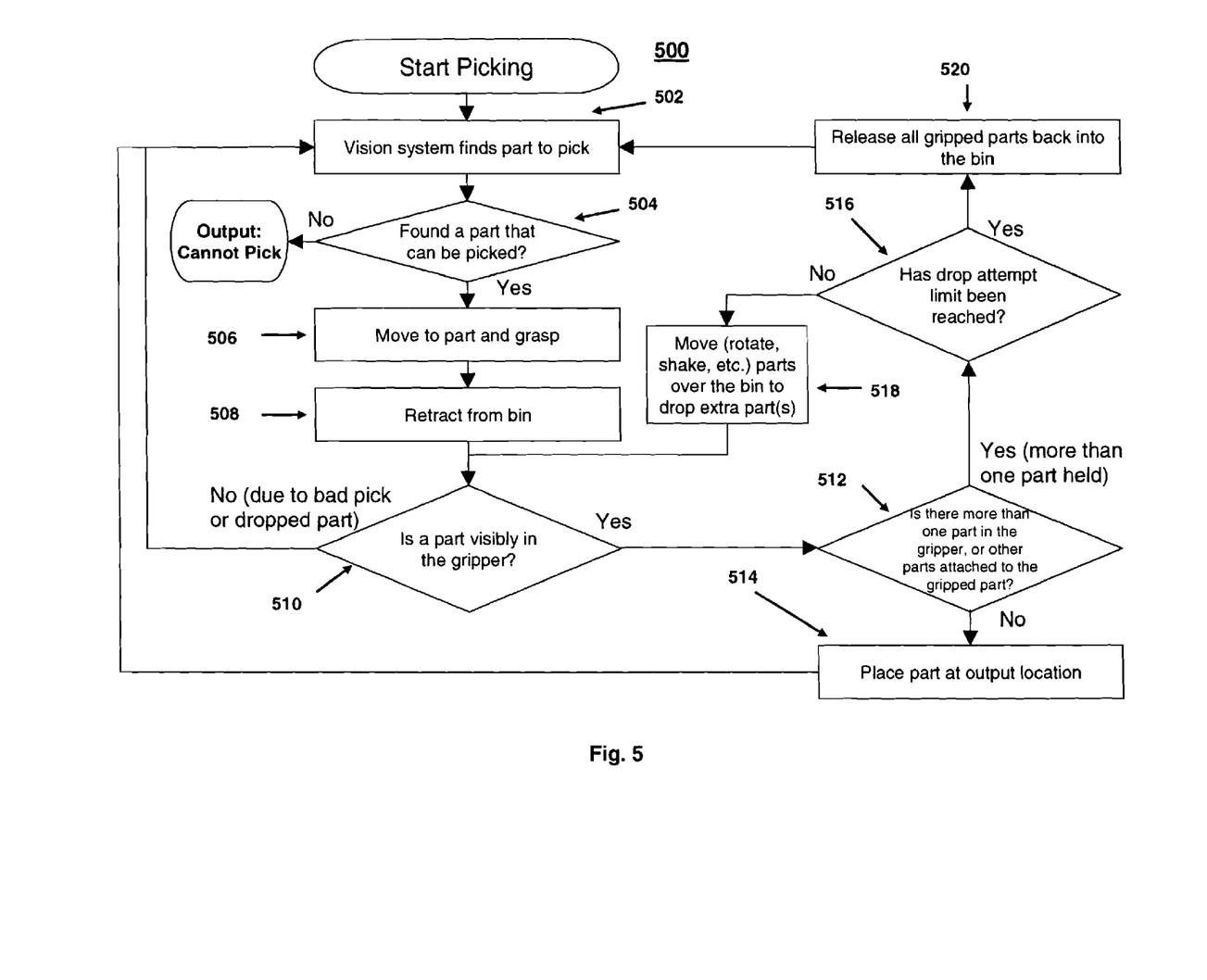
FIG. 5 shows a flowchart for the control flow for using a vision system to pick parts from a bin.

Referring now to FIG. 5, there is shown a flowchart 500 for the above described control flow to ensure that only one part 41 is picked by robot 12 from bin 40.

At block 502, the vision system 36 finds a part 41 that can be picked from bin 40. The process proceeds to decision block 504 where it is asked if the vision system 36 has a found a part 41 that can be picked from bin 40. If the answer is no, a "cannot pick" signal is output to the controller 14 or other computing device. If the answer to the question in decision block 504 is yes, the process proceeds to block 506 where the gripping mechanism 24 is commanded to move to and grasp the part 41.

At block 508, the gripper 24 is retracted from bin 40. The gripper 24 should be grasping a part 41 and thus at decision block 510 it is asked if the vision system sees that the gripper 24 is holding at least one part 41. If the answer is no, this means that gripper 24 has not grasped a part 41 either because of a bad pick or that the picked part 41 was dropped by the gripper 24. Therefore the procedure returns back to block 502 to begin again the picking process.

If the answer to the question in decision block 510 is yes, then the gripper 24 is holding at least one part 41. The process then proceeds to decision block 512 where it is asked if the gripper 24 is either holding more than one part 41 or are other parts 41 attached to the gripped part 41. The answer to this question based on processing the image from the cameras 38 determines if the gripper 24 is holding only one part 41 or has gripped two or more parts 41. If the answer to the question in decision block 512 is no, then the gripper 24 is holding only one part 41 that has no other parts attached to the gripped part and the process proceeds to block 514 where the gripped part 41 proceeds to where it can be used in another operation. The process then returns from block 514 to block 502 to find another part 41 to pick from bin 40.

If the answer to the question in decision block 512 is yes, then the process proceeds to decision block 516 where it is asked if the predetermined drop attempt limit has been reached. This question is asked to prevent the robot 12 from continuously repeating the process to drop off extra part(s). The predetermined drop attempt limit could, for example, be timed based or based on the number of attempts to shake the parts free. If the answer to question in block 516 is no, the process proceeds to block 518 where the grasped parts are moved or rotated or shaken over the bin 40 so that the extra parts can be dropped back into bin 40. If the answer to the question of decision block 516 is yes, the process proceeds to block 520 where all of the gripped parts 41 are released back into bin 40.

While the flowchart of FIG. 5 shows a decision block for the question asked in block 510 and another decision block for the question asked in block 512, it should be appreciated that both questions can be answered in a single decision block since determining how many parts 41 are held by the gripper 24 or that other parts 41 are attached to the gripped part 41 is dependent on the part(s) being visibly in the gripper 24.

In addition to the above, the position and/or orientation of a picked part 41 may shift in the gripper due to some obstructions during the extraction process, an imperfect grasp, or other errors. Cameras 38, mounted either on the robot shown in FIGS. 2 and 3 or in other locations in the work cell where the robot is located such as the location of the fixed cameras 38 shown in FIGS. 1 and 4, can detect the part's position and orientation, and then determine if a shift has occurred that is too large for the system to handle. In such a case, the part 41 would have to be returned to the bin 40 and another pick would be attempted. If a shift has occurred, but was not too large, the system can optionally perform a small transformation to the output position/orientation so that the part will be delivered to the correct output position/orientation.

Figure 6:
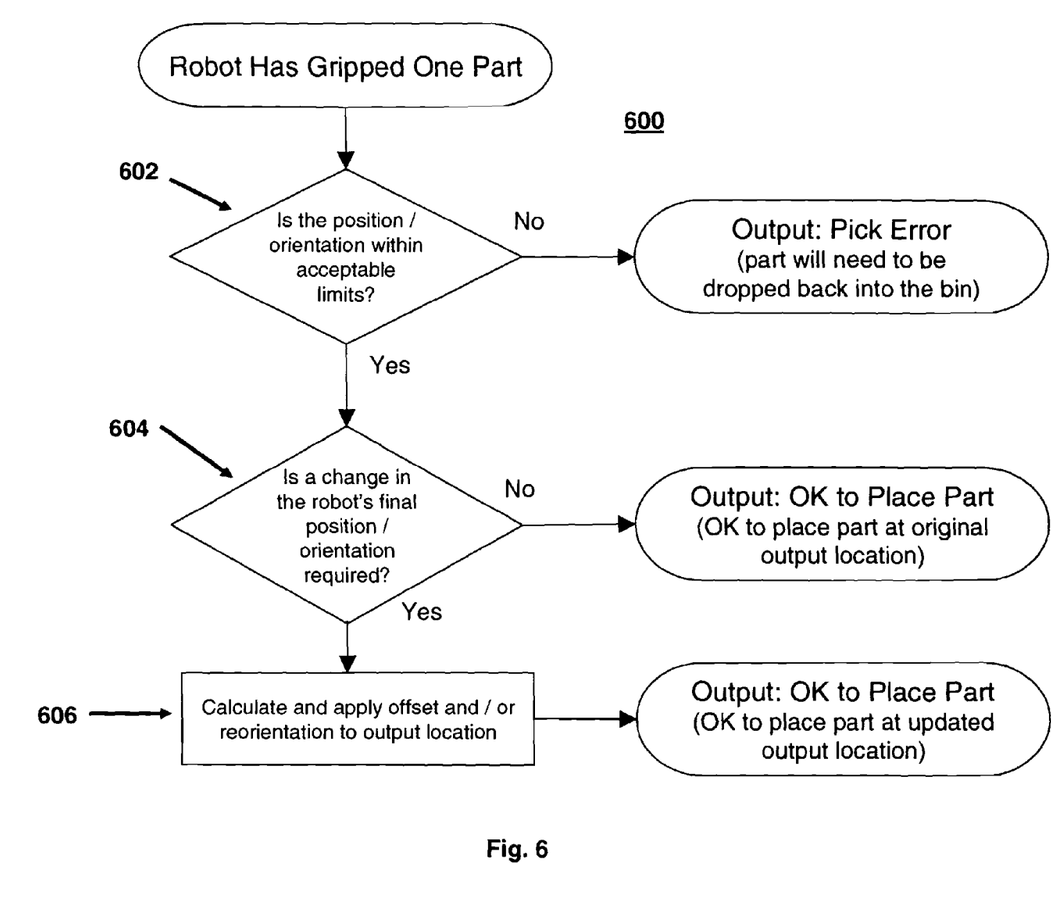
FIG. 6 shows a flowchart for procedure to determine if the output position/orientation of the picked part is within predetermined limits so that the part can be used in a subsequent operation.

Referring now to FIG. 6, there is shown a flowchart for one procedure 600 for determining if the output position/orientation of the picked part 41 is within predetermined limits so that the picked part can be used in the next operation. The procedure 600 can start either after the procedure 500 described above has determined that the gripper 24 has gripped only one part 41 or can operate in parallel with the operation of the combination of decision blocks 510 and 512.

At decision block 602, the procedure 600 asks if the position/orientation of the picked part 41 is within predetermined acceptable limits. This could be determined by comparing the difference between the current position and a pre-defined position of the picked part 41. The system will verify that this difference does not exceed predetermined acceptable limits. If the answer to the question asked in decision block 602 is no, then a pick error has occurred and the picked part 41 will be dropped back into the bin 40 and an appropriate error message can be displayed on the display terminal associated with the controller 14 or other computing device.

If the answer to the question asked in decision block 602 is yes, then the procedure 600 proceeds to decision block 604 where it is asked if it is required to change the final position/orientation of the robot 12. This can be determined by comparing the difference between the current position/orientation of the picked part 41 and a pre-defined position/orientation of the picked part 41. The system verifies that this difference is within a predefined range of a predetermined required position/orientation. If the answer to the question asked in decision block 604 is no, then the gripped part 41 proceeds to where it can be used in another operation. If the answer to this question is yes, then the procedure 600 proceeds to block 606 where the difference between the current and a pre-defined position/orientation of the picked part 41 is applied to cause the robot 12 either by itself or together with the gripper 24 or only by the gripper 24 to change the position/orientation of the picked part 41 so that the picked part 41 proceeds to the desired position/orientation for the next operation.

Some or all of the cameras 38 can be used for one or more of the vision-based aspects of the system, including: finding a part 41 in the bin 40, detecting if a part 41 was picked, detecting if extra parts 41 were picked, and/or detecting if a picked part's position/orientation has shifted significantly.

Part presence and part location can be implemented using industry standard vision libraries, or using commercially available vision applications. Examples of vision libraries include, but are not limited to, the libraries available from Matrox Graphics and Cognex. An example of a vision application, includes but is not limited to, ABB TrueView.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A robotic system for picking parts from a bin comprising:
    a robot having a gripper for picking one of said parts from said bin when said robot is so commanded;
    one or more cameras mounted to provide one or more images that show how many of said parts in said bin are held by said gripper after said robot is commanded to pick one of said parts from said bin and said gripper is retracted from said bin;
    a computing device programmed to use said one or more images to, when said one or more images shows that said retracted gripper is holding only one of said parts, determine if the position and/or orientation of said only one held part meets a predetermined criteria for said position and/or orientation of said only one held part; and
    said computing device further programmed to, after it is determined that said only one part held by said retracted gripper does not meet said predetermined criteria for said position and/or orientation of said only one part held by said retracted gripper, command said robot to move said retracted gripper holding said only one part to return said picked only one part held by said gripper to said bin.

2. A robotic system for picking parts from a bin comprising:
    a robot having a gripper for picking one of said parts from said bin when said robot is so commanded;
    one or more cameras mounted to provide one or more images that show how many of said parts in said bin are held by said gripper after said robot is commanded to pick a part from said bin and said gripper is retracted from said bin;
    a computing device programmed to use said one or more images, after said one or more images shows that said retracted gripper is holding only one of said parts, to determine if the position and/or orientation of said only one part held by said retracted gripper meets a predetermined criteria for said position and/or orientation of said only one part held by said retracted gripper; and
    said computing device further programmed to, after it is determined that said only one part held by said retracted gripper does not meet said predetermined criteria for said position and/or orientation of said only one part held by said retracted gripper, command said robot either by itself or together with said gripper or only said gripper to adjust said position and/or orientation of said only one part held by said retracted gripper to be within said predetermined criteria.

3. The robotic system of claim 1, further comprising a display terminal associated with said computing device, said computing device further programmed to, after it is determined that said one part held by said retracted gripper does not meet said predetermined criteria for said position and/or orientation, display an appropriate error message on said display terminal.

4. The robotic system of claim 1, wherein said computing device is further programmed to, after it is determined that said only one part held by said retracted gripper meets said predetermined criteria for said position and/or orientation, further determine if said position and/or orientation of said only one part held by said retracted gripper should be adjusted before said only one part held by said retracted gripper is moved to a location where said held only one part is to be used in another operation.

5. The robotic system of claim 4, wherein said computing device is further programmed to, after it is determined that said only one part held by said retracted gripper should be adjusted before said only one part held by said retracted gripper is to be moved to another location where said held part is to be used, adjust said position and/or orientation of said held only one part before said held only one part is to be used in said another operation.

6. The robotic system of claim 5, wherein said computing device is further programmed to, after adjusting said only one held part's position and/or orientation, move said adjusted only one held part to said another location.

7. The robotic system of claim 2, further comprising a display terminal associated with said computing device, and said computing device is further programmed to, after it is determined that said only one part held by said retracted gripper does not meet said predetermined criteria for said position and/or orientation, display an appropriate error message on said display terminal.

8. The robotic system of claim 2, wherein said computing device is further programmed to, after it is determined that said only one part held by said retracted gripper meets said predetermined criteria for said position and/or orientation, further determine if said position and/or orientation of said only one part held by said retracted gripper should be adjusted before said only one part held by said retracted gripper is to be moved to a location where said held only one part is to be used in another operation.

9. The robotic system of claim 8, wherein said computing device is further programmed to, after it is determined that said only one part held by said retracted gripper should be adjusted before said only one part held by said retracted gripper can be moved to another location where said held part is to be used, adjust said position and/or orientation of said held only one part before said held only one part can be used in said another operation.

10. The robotic system of claim 9, wherein said computing device is further programmed to, after said only one held part's position and/or orientation is adjusted, move said adjusted only one held part to said another location.

11. The robotic system of claim 1 wherein said computing device is further programmed to determine from said one or more images from said one or more cameras if said retracted gripper is holding more than one of said parts and command said robot and after it is determined that said retracted gripper is holding more than one part to move said retracted gripper over said bin and attempt to return to said bin all but one of said parts held by said retracted gripper.

* * * * *